Jan. 8, 1963 S. LOEWE 3,072,352

PLAYBACK ARRANGEMENT FOR TAPE RECORDERS AND THE LIKE

Filed Dec. 18, 1959 2 Sheets-Sheet 1

INVENTOR.
Siegmund Loewe

BY

Michael S. Striker
Attorney

Jan. 8, 1963 S. LOEWE 3,072,352

PLAYBACK ARRANGEMENT FOR TAPE RECORDERS AND THE LIKE

Filed Dec. 18, 1959 2 Sheets-Sheet 2

INVENTOR.
Siegmund Loewe
BY
Michael S. Striker
Attorney

United States Patent Office 3,072,352
Patented Jan. 8, 1963

3,072,352

PLAYBACK ARRANGEMENT FOR TAPE RECORDERS AND THE LIKE

Siegmund Loewe, Yonkers, N.Y.; Bernard Lowe, administrator of Siegmund Loewe, deceased Filed Dec. 18, 1959, Ser. No. 860,523
Claims priority, application Germany Aug. 3, 1954
7 Claims. (Cl. 242—55.12)

The present invention relates to devices capable of playing back sound recorded on magnetic tape or the like. Ordinarily such devices form part of a tape or wire recorder.

The instant application is a continuation-in-part of copending application Serial No. 522,507, filed July 18, 1955 and now abandoned and entitled Process and Arrangement for Undertaking Switching Measures With Tape Recorders.

In playing back the sounds recorded on a magnetic tape or the like, it is of course necessary to place the tape in such position that the sound will be played back at the beginning of the desired portion of recorded material. Of course, it is common to record on a single tape several distinct recordings and the problem arises as how to locate the tape quickly and efficiently in a position for playing back the desired recording which may be anywhere along the tape.

At the present time this problem is not solved in a satisfactory manner. Although it is possible to indicate where a certain recorded material starts on a given tape, it is essential to use the counter which forms part of a tape recorder in order to count the amount of tape which runs onto a given reel from one end of the tape in order to reach a number on the counter which indicates where the desired recorded material is located. In other words, at the present time the user of the recorder notes the number on the counter at which the recorded material occurs, and it becomes necessary for the user to always start the counter at zero and wind up a given amount of tape in order to reach the desired indication, and even then there is no great accuracy with this method and often it is found that the tape must be run a little more or a little less than before the actual beginning of the desired portion of the recorded material is located.

It is accordingly one of the primary objects of the present invention to provide an arrangement which will overcome the above drawback by enabling the user of a tape of the type referred above to locate quickly and easily any preselected part of the tape at a desired location without requiring the use of the counter and without requiring the tape to be wound up from one end until the desired number of the counter is reached.

A further object of the present invention is to provide a means for transporting the tape rapidly but at the same time with extreme accuracy so that the tape will always be wound in exactly the same way on to and off from the reels.

Still another object of the present invention is to provide an exceedingly simple and effective means for indicating when a certain part of the tape is at a given location.

With the above objects in view the invention includes in a playback apparatus for magnetic tape or the like, a rotary take-up reel means and a drive means for driving this reel means at a given predetermined speed. A time indicating means cooperates with a tape on this reel means for indicating the time required for any part of the tape to reach a given location during winding of the tape on to the reel means when the latter is driven at the above given speed. A means cooperates with the reel means for maintaining the tape wound on to or off from the reel means at a substantially constant tension. Finally, a manually operable means cooperates with the drive means for actuating the latter to drive the reel means in one direction or the other at the above given speed, so that the time required for a part of the tape having a given time indication to reach the above location during driving of the reel means is equal to the difference between the latter given time indication and the time indication of the part of the tape which happens to be at the above location.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
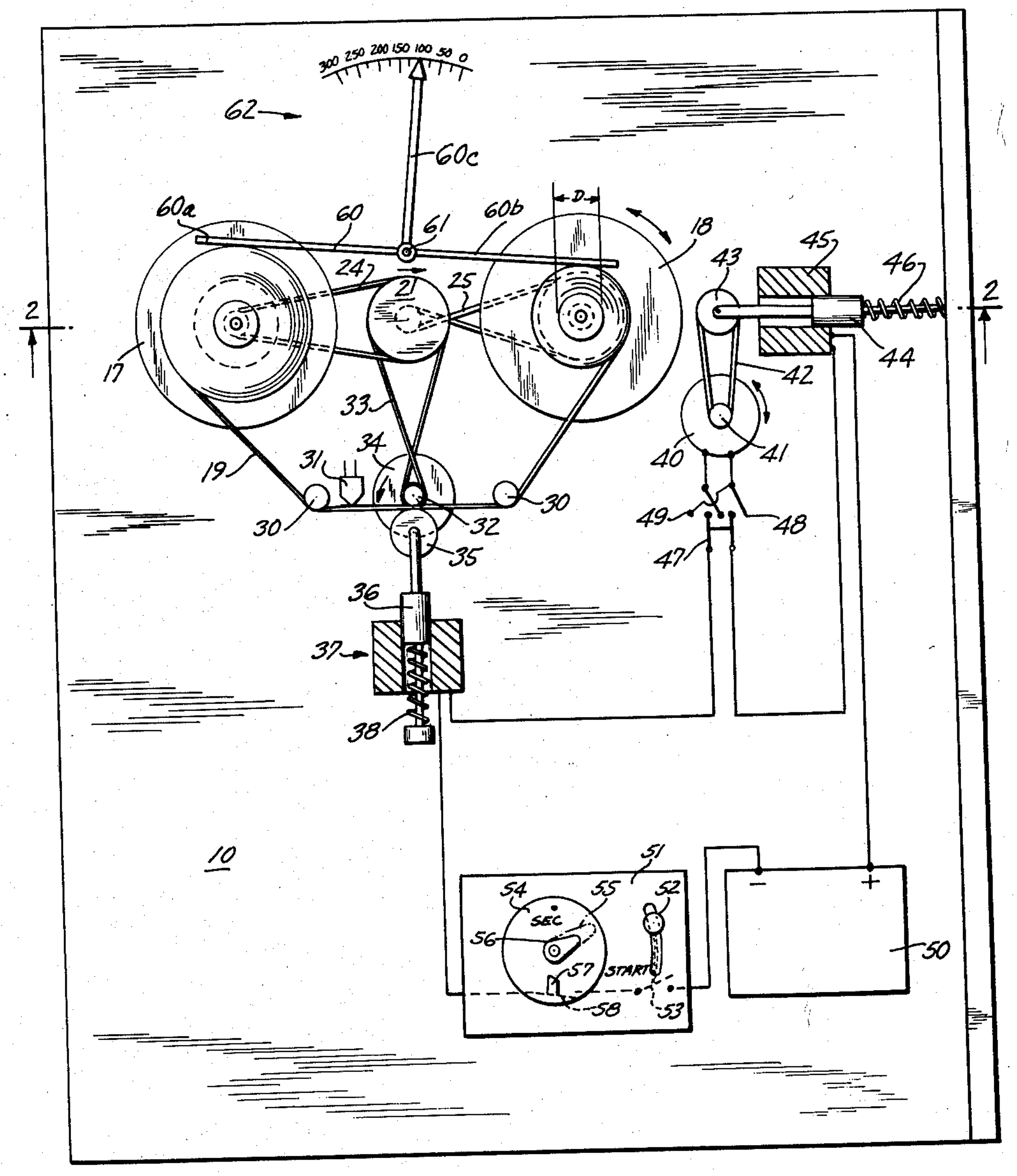
FIG. 1 is a diagrammatic view of one embodiment of an apparatus according to the invention.
Figure 2:
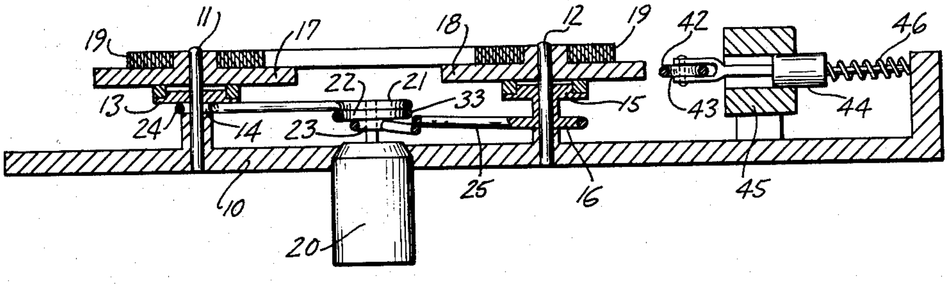
FIG. 2 is a section taken along line II—II of FIG. 1 in direction of the arrow.

Referring now to the drawings and to FIGS. 1 and 2 in particular, the structure of the invention includes a support means in the form of a suitable base or carrier plate 10. This support means also includes a pin 11 fixed to and extending upwardly from the plate 10 as well as a similar pin 12 identical with and parallel to pin 11. The pin 11 extends through and guides for free rotation a friction clutch plate 13 to which a pulley 14 is fixed, and the pin 12 supports for free rotation a friction clutch plate 15 to which a pulley 16 is fixed. A reel 17 rests against the friction clutch plate 13, and a reel 18 rests against the friction clutch plate 15. A tape 19 has portions wound on to both of the reels 17 and 18 and a part extending between these reels. The reel 17 is a supply reel while the reel 18 is a take-up reel.

The plate 10 fixedly carries a motor 20 which forms part of one of the drive means of the structure disclosed in FIGS. 1 and 2. This motor 20 drives three pulleys 21, 22 and 23 which are fixed coaxially to each other and rotate together. A belt 24 passes around the pulley 21 as well as the pulley 14 so as to drive the friction clutch 13 and through the latter the supply reel 17 assuming that the latter does not slip with respect to the plate 13, and it will be noted that the pulley 14 is of a much smaller diameter than the pulley 21 so that the plate 13 tends to drive the supply reel 17 at a speed considerably greater than the speed of rotation of the pulley 21.

The pulley 23 has a crossed belt 25 passing around the same, and this crossed belt 25 also extends around the pulley 16 so that the friction clutch plate 15 and the take-up reel 18 are driven by the belt 25 and pulley 23 through the pulley 16. Because of the crossing of the belt 25 the direction of rotation of the pulley 16 and the take-up reel 18 is reversed with respect to the driving direction of the motor 20. Thus, assuming that the motor 20 drives the pulleys 21, 22, and 23 in a clockwise direction, as viewed in FIG. 1, then it will be seen that the belt 24 cooperates with the pulley 14 to rotate the friction clutch 13 and the supply reel 17 if the latter does not slip with respect to the friction clutch 13 also in a clockwise direction, as viewed in FIG. 1. However, due to the crossing of the belt 25 the take-up reel 18 will be driven in a counter clockwise direction, as viewed in FIG. 1, by the drive from the motor 20.

The tape 19 is guided along the instrument by suitable guide pins 30 or the like, and the tape passes by a magnetic head 31 shown diagrammatically in FIG. 1 and connected through a suitable amplifier with a loud speaker for playing back the material recorded on the tape 19, all of this being done in a well known manner. During playing back of the material on the tape 19 this tape is driven from the supply reel 17 to the take-up reel 18 through a low-speed drive means formed in part by the motor 20 and the pulley 22. This low-speed drive means includes, in addition, a drive roll 32 in the form of a pulley turnably carried by the plate 10 for rotation about an axis parallel to the axis of rotation of the pulley 22, a crossed belt 3 passing around the pulley 22 and around the drive roll 32 to drive the latter in a counter clockwise direction, as viewed in FIG. 1 so as to advance the tape to the right, as viewed in FIG. 1. A fly wheel 34 is coaxially fixed to the driving roll 32 for rotation with the latter and maintains the speed of rotation of the driving roll 32 constant. The tape 19 is held against the roll 32 by a pressure roll 35 turnably carried by an armature 36 of an electromagnetic solenoid 37, this armature 36 being urged to the position illustrated in FIG. 1 by a spring 38. When the coil of the solenoid 37 is energized the armature 36 will be retracted away from the tape 19 so that the pressure roll 35 will no longer press the tape against the drive roll 32 and thus the drive roll 32 will no longer transport the tape to the right, as viewed in FIG. 1, and so the play-back will terminate.

During the movement of the tape from the supply reel 17 to the take-up reel 18 it will be seen that with the structure of the invention the friction clutch 13 is driven in a direction which opposes the movement of the tape from the supply reel 17 to the take-up reel 18, but the driving of the feed roll 32 overcomes any tendency of the friction clutch 13 to drive the supply reel 17 in a clockwise direction, as viewed in FIG. 1, and so the tape will be moved from the supply reel 17 to the take-up reel 18, but because the reel 17 is at this time constantly slipping with respect to the friction clutch 13 the tape will at all times be under a certain tension and this tension is maintained substantially constant throughout the operation of the apparatus so that the density of the bodies of tape wound on the reels 17 and 18 are always substantially constant and as a result a given part of the tape will always be precisely located at the magnetic head 31, for example, when the bodies of tape wound on the reels 17 and 18 have a given diameter, and whenever this diameter is reached it will be known that precisely the desired part of the tape will be located at the given location which in this example happens to be the magnetic head 31. In this way, by maintaining the tape at all times under a certain tension it is possible to precisely locate a given part of the tape at a given location. The term "density" as used above and as used in the claims refers to the tightness with which the convolutions of the tape are wound against each other. Thus, a reel having the tape convolutions loosely wound will have a lesser density than a reel having the tape tightly wound thereon. Bearing in mind that sound-recording tape is substantially non-stretchable, it is apparent that if the tape is maintained under a substantially constant tension then all of the convolutions will be wound one next to the other without any looseness so that the density will be constant.

Of course, the tape is moved rather slowly by the motor 20, pulley 22, belt 33, and feed roll 32, all of which constitute a low speed drive means for moving the tape from the supply reel to the take-up reel during playing back, and this low-speed would never do for moving the tape until a desired part thereof is located at a desired location such as at the head 31 in order to position the beginning of a section of recorded material at the head 31. It is necessary to drive the tape at a much higher speed so as to be able to locate very quickly a desired part of the tape at the head 31, for example, and for this purpose a high-speed drive means according to the invention is provided, this high-speed drive means cooperating with the take-up reel 18 to rotate the latter in one direction or the other.

Referring to FIG. 1, it will be seen that the plate 10 carries a second motor 40 which is the motor of the high-speed drive means, and this motor drives a pulley 41 which by a belt 42 drives a pulley 43 turnably carried by the armature 44 of an electromagnetic solenoid 45, a spring 46 being connected to the armature 44 to pull the latter to the right, as viewed in FIG. 1, to the position illustrated in FIG. 1 where the pulley 43 is spaced from the periphery of the reel 18. When the armature is moved by the energized coil of the solenoid 45 to the left, as viewed in FIG. 1, the belt 42 on the pulley 43 will be placed in direct contact with the periphery of the take-up reel 18, as is evident particularly from FIG. 2, and now the take-up reel 18 will be driven at a speed much higher than any speed of movement of the latter by the belt 25 and the pulley 16 or the speed which is permitted by the drive roll 32. Of course, during playback when the speed of movement of the tape is controlled by the drive roll 32 the pulley 16 is driven by the belt 25 at a speed somewhat higher than the speed of rotation of the reel 18 permitted by the drive roll 32, so that here again the friction clutch plate 15 slips with respect to the take-up reel 18 and thus guarantees the maintenance of a certain constant tension in the tape at all times.

The motor 40 is a constant speed motor having a field whose windings are capable of being energized in one of two ways so as to control the direction of rotation of the pulley 41 and thus of the pulley 43 and the belt 42. As may be seen from FIG. 1, the plate 10 carries a pair of switch arms 47 which can be turned by the operator from the rest position shown in FIG. 1 either in a clockwise direction or in a counter clockwise direction. If the operator turns the switch arms 47 in a clockwise direction they will contact the pair of contacts 48 and will deliver current to certain windings of the field of the motor 40 which will produce rotation of the armature thereof in one direction, while, when the operator turns the switch arms 47 in a counter clockwise direction as viewed in FIG. 1, these arms will contact the left contact 49 and the left contact 48 of FIG. 1 so as to energize the field of the motor 40 in such a way that this will rotate in opposite direction. The switch arms 47 are located in an electrical circuit with the solenoids 37 and 45, this circuit being supplied by a battery 50 and including a timer 51. The timer 51 includes a manually operable lever 52 which, when turned down, as viewed in FIG. 1, to the start position closes a switch 53 which closes the circuit and energizes the solenoids 37 and 45. Before starting the device in this way the operator first sets a clock 54 of the timing device 51 so that the pointer 55 of the clock will turn through an indicated angle requiring a certain number of seconds before the pointer 55 reaches the lowermost position of the dial of the clock. A cam 56 turns with the pointer 55 and engages a cam 57 carried by a normally closed switch 58, the arrangement being such that when the cam 56 engages the cam 57 it will move the latter and the switch 58 to a position opening the circuit, so that in this way the circuit will be closed and the solenoids 37 and 45 will be energized for a preselected period of time.

In accordance with the present invention a time indicating means cooperates with the tape 19 to indicate the time required for a certain part of the tape, which may be any selected part thereof, to reach a given location such as the magnetic head 31. Thus, assuming that one end of the tape is connected with the core of the reel 18 and that this reel 18 is now driven in a counter clockwise direction, as viewed in FIG. 1, by the pulley 43 or, more accurately, the belt 42 which drives the pulley or reel 18 in a counter clockwise direction at a precisely determined speed due to the constant speed of the motor 40, then of course it is clear that a certain specific time will be required for each part of the tape which is being wound on to the reel 18 under these conditions to reach any desired location such as the magnetic recording head 31. The indicating means of the invention indicates the time required for any part of the tape to reach this given location, and this indicating means may take various different forms.

As was pointed out above, due to the structure of the invention the tape is kept at all times at a substantially constant tension so that the density of the bodies of tape wound on to the reels is constant at all times. The result is that the diameters of the bodies of tape on the reels is always an accurate indication of the length of the tape wound on to the reels.

The time indicating means of FIG. 1 includes a T-shaped lever 60 which is supported on a suitable pin or the like for rotation about a vertical axis normal to the plate 10, this pin 61 being shown in FIG. 1 at the junction between the several arms of the lever 60. The pair of horizontal arms 60*a* and 60*b* of the lever are in engagement at all times with the bodies of tape wound on to the pair of reels 17 and 18, and since the diameter of one of these bodies will increase while the diameter of the other decreases, the lever 60 will necessarily turn in one direction or the other about the pivot 61 during movement of the tape between the reels. The third arm 60*c* of the lever 60 acts as a pointer and moves along a scale 62 carried by the plate 10 and having graduations which extend from 0 to 300 seconds. Thus, the length of the tape 19 is such that when the reel 18 is driven from the motor 40 which, together with belt 42 and pulley 43 forms a high-speed drive means, it will take 5 minutes or 300 seconds for the entire tape to be wound from one end to the other end thereof on to the take-up reel 18. Thus, when the starting end of the tape is on the reel 18 the pointer 60*c* will be at the 0 second end of the scale 62, and during building up of the tape on to the take-up reel 18 the lever 60 will continuously turn in a counter clockwise direction, as viewed in FIG. 1, the pointer 60*c* at all times pointing to a time indication on the scale 62 which indicates which precise part of the tape 19 happens to be located at the head 31, for example. In other words, when the pointer 60*c* is at 0 one end of the tape may be connected with the reel 18 but the part of the tape at the head 31 will have a zero time indication, and the successive time indications all along the scale 62 indicate different parts of the tape 19.

With this arrangement any desired part of the tape can be located at any desired location such as the head 31 in the above example. Thus, assume that the user knows that the desired part of the tape has a time indication of 225. In other words he wants to playback a part of the material which is recorded on the tape starting at the part thereof which has the time indication 225. Let us assume also that the structure has the position shown in FIG. 1 where the pointer 60*c* indicates that the part of the tape having the time indication 100 is located at the magnetic head 31. All that the operator need do is to determine the difference between the 100 time indication and the 225 time indication, this difference of course being equal to 125. The operator now sets the clock 54 of the timer 51 to run for 125 seconds and turns the switch arms 47 to contact the pair of contacts which will drive the reel 18 in a counter clockwise direction, as viewed in FIG. 1, and once this is done the operator need only move the button 52 down so as to close the switch 53 and energize the solenoids. When this happens the pressure roll 35 will be retracted so that the feed of the tape by the roll 32 cannot take place and at the same time the pulley 43 and belt 42 are pushed to the left, as viewed in FIG. 1, by the armature 44, so that the high-speed drive is now actuated to drive the pulley 18, and this pulley will be driven for precisely 125 seconds in the above example, at which time the switch 58 will open to automatically stop the driving and return the parts to the position shown in FIG. 1, and at this time the part of the tape which has the indication 225 will be precisely located at the head 31.

In this manner simply by calculating the difference between the time indication of the desired part of the tape and the time indication of that part which happens to be at the head 31 the operator can quickly and easily set the timer to automatically locate the desired portion of the tape at the desired location. It is completely unnecessary to refer to the counter or to start from one end of the tape in order to reach a given location.

Figure 3:
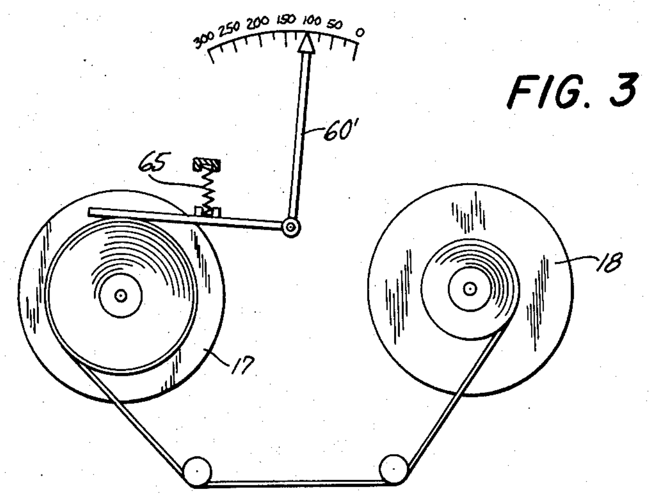
FIG. 3 is a fragmentary view of a slightly different embodiment of the structure of FIG. 1.

Instead of a lever of the structure shown in FIG. 1, an arrangement such as that shown in FIG. 3 may be used where the lever 60′ engages only one of the bodies on one of the reels, this being the reel 17 in this case although it could equally be the reel 18 if desired, and a spring 65 maintains the lever 60′ in engagement with the body of tape wound around the reel 17, the pointer of the lever 60′ cooperating with a scale 62 identical with that of FIG. 1. In this way it is possible to simplify the structure of the lever somewhat.

It should be noted that the above extremely simple indicating structure of the invention can be used because the tape is maintained at constant tension at all times and therefore precisely the same part of the tape can be repeatedly located at a given location during winding or unwinding of the tape from the reels.

Of course, when the reel 18 is driven in a clockwise direction by the high-speed drive means the tape will move to the left, as viewed in FIG. 1, from the take-up reel 18 on to the supply reel 17, and the speed of rotation of the pulley 14 and friction clutch 13 is sufficiently high to tend to turn the supply reel 17 at a speed greater than that at which the take-up reel 18 is driven by the high-speed drive means 40—43, so that the tension in the tape is still reliably maintained.

Figure 4:
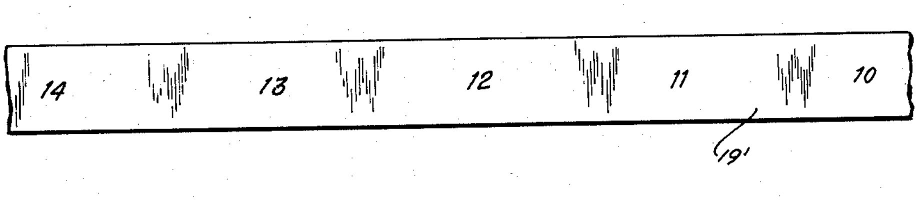
FIG. 4 is a view showing a part of a tape having thereon a time indicating means according to the invention.

Instead of an arrangement where the scales and levers are used to give the time indications, the time indications may be located directly on the tape, as indicated in FIG. 4, where the time indications from 10 to 13 seconds are illustrated, and simply by looking at the tape with this embodiment the operator will know that the 10 second indication cooperates with a part of the tape which will be located at the head 31, for example, after the tape has been wound on to the take-up reel 18 for 10 seconds. Thus, with this arrangement also it is only necessary for the operator to calculate the difference between the desired time indication and the time indication of that part of the tape which happens to be at the recorder 31 or at any other desired location in accordance with the particular criterion made for the time indications, and then the tape is simply driven by the high-speed drive means in cooperation with the take-up reel means for a period of time equal to the calculated time difference and the desired part of the tape will be quickly and efficiently rotated at the desired location.

Of course, instead of a timer 51 which will automatically terminate the drive after a given passage of time, it is possible for the operator to simply have a stop watch which he can use to operate the high-speed drive for a desired length of time.

Thus, with the structure of the invention it is an exceedingly simple matter for the operator to locate any desired part of the tape in a position for playing back a desired recording, without any of the complications used in connection with counters of the recorders.

It will be understood that each of the elements described above, or two or more together, may also find a useful application in other types of recorders differing from the types described above.

While the invention has been illustrated and described as embodied in playback apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for playing back a tape recording, in combination, two rotary tape supporting means supporting a tape wound up on said two tape supporting means for winding off from one and onto the other tape supporting means and vice versa; tension means maintaining the tape during winding up on one of said supporting means under substantially constant tension so that the density of a wound up body of tape remains substantially constant; drive means for rotating at a constant speed the rotary supporting means on which the tape is wound up; time indicating means cooperating with the tape for indicating the time required for selected points of the tape to reach a predetermined location during winding of the tape from a predetermined point thereof on to said rotary supporting means when the latter are driven at said constant speed and the density of the wound tape is kept substantially constant by said tension means; and manually operable actuating means for actuating said drive means to drive the rotary support means on which the tape is wound, whereby a tape may be wound up from a position in which a first point thereof is at said predetermined location into a position at which a second point thereof is at said predetermined location by determining the time difference between the time values corresponding to said first and second points and actuating the rotary tape supporting means for a period of time equal to said time difference.

2. In a playback apparatus for magnetic tape or the like, in combination, rotary supply reel means and rotary take-up reel means, both of which have a tape wound thereon with a portion of the tape extending between the two reel means; drive means for driving said take-up reel means at a given speed; time indicating means cooperating with a tape on the two reel means for indicating the time required for any part of the tape to reach a given location during winding of the tape on to said take-up reel means when the latter is driven at said speed; means cooperating with both of said reel means for maintaining a tape on the latter at substantially constant tension; and manually operable means cooperating with said drive means for actuating the latter to drive said take-up reel means in one direction or the other at said given speed; whereby the time required for a part of the tape having a given time indication to reach said location during driving of said take-up reel means is equal to the difference between said given time indication and the time indication of the part of the tape which happens to be at said location.

3. In a playback apparatus for magnetic tape or the like in combination, rotary supply reel means and rotary take-up reel means both of which support a tape for movement from one to the other of said reel means; low-speed drive means cooperating with a tape for driving the latter at a given relatively low speed from said supply reel means to said take-up reel means during playback of the tape; high-speed drive means for driving said take-up reel means at a speed which will move the tape at a substantially greater rate than said low speed drive means; time indicating means cooperating with a tape on both of said reel means for indicating the time required for any part of said tape to reach a given location during winding of the tape on to said take-up reel means when the latter is driven by said high-speed drive means; means cooperating with both of said reel means for maintaining the tape at a substantially constant tension; and manually operable means cooperating with said high-speed drive means for actuating the latter to drive said take-up reel means in one direction or the other, whereby the time required for a part of the tape having a given time indication to reach said location during driving of said take-up reel means is equal to the difference between said given time indication and the time indication of the part of the tape which happens to be at said location.

4. In a playback apparatus for magnetic tape or the like in combination, rotary supply reel means and rotary take-up reel means both of which support a tape for movement from one to the other of said reel means; low-speed drive means cooperating with a tape for driving the latter at a given relatively low speed from said supply reel means to said take-up reel means during playback of the tape; high-speed drive means for driving said take-up reel means at a speed which will move the tape at a substantially greater rate than said low speed drive means; time indicating means cooperating with a tape on both of said reel means for indicating the time required for any part of said tape to reach a given location during winding of the tape on to said take-up reel means when the latter is driven by said high-speed drive means; means cooperating with both of said reel means for maintaining the tape at a substantially constant tension, said means for maintaining the tape at a substantially constant tension at all times including a slip clutch driven by said low-speed drive means and cooperating with said supply reel means for tending to turn the latter in a direction which will move tape from said take-up reel means on to supply reel means and for tending to turn said supply reel means at a speed greater than that at which said take-up reel means is driven by said high-speed drive means; and manually operable means cooperating with said high-speed drive means for actuating the latter to drive said take-up reel means in one direction or the other, whereby the time required for a part of the tape having a given time indication to reach said location during driving of said take-up reel means is equal to the difference between said given time indication and the time indication of the part of the tape which happens to be at said location.

5. In a playback apparatus for magnetic tape or the like in combination, rotary supply reel means and rotary take-up reel means both of which support a tape for movement from one to the other of said reel means; low-speed drive means cooperating with a tape for driving the latter at a given relatively low speed from said supply reel means to said take-up reel means during playback of the tape; hgh-speed drive means for driving said take-up reel means at a speed which will move the tape at a substantially greater rate than said low speed drive means; time indicating means cooperating with a tape on both of said reel means for indicating the time required for any part of said tape to reach a given location during winding of the tape on to said take-up reel means when the latter is driven by said high-speed drive means; means cooperating with both of said reel means for maintaining the tape at a substantially constant tension; and manually operable means cooperating with said low-speed drive means for removing the influence of the latter on said tape and cooperating with said high-speed drive means for actuating the latter simultaneously with the removal of the influence of said low-speed drive means from said tape to drive said take-up reel means in one direction or the other, whereby the time required for a part of the tape having a given time indication to reach said location during driving of said take-up reel means is equal to the difference between said given time indication and the time indication of the part of the tape which happens to be at said location.

6. In a playback apparatus for magnetic tape or the like in combination, rotary supply reel means and rotary take-up reel means both of which support a tape for movement from one to the other of said reel means; low-speed drive means cooperating with a tape for driving the latter at a given relatively low speed from said supply reel means to said take-up reel means during playback of the tape; high-speed drive means for driving said take-up reel means at a speed which will move the tape at a substantially greater rate than said low speed drive means; time indicating means cooperating with a tape on both of said reel means for indicating the time required for any part of said tape to reach a given location during winding of the tape on to said take-up reel means when the latter is driven by said high-speed drive means; means cooperating with both of said reel means for maintaining the tape at a substantially constant tension; and manually operable electromagnetic means cooperating with said low-speed drive means and with said high-speed drive means for eliminating the influence of said low-speed drive means on the tape and for simultaneously applying said high-speed drive means to said take-up reel means for driving the latter with said high-speed drive means in one direction or the other, whereby the time required for a part of the tape having a given time indication to reach said location during driving of said take-up reel means is equal to the difference between said given time indication and the time indication of the part of the tape which happens to be at said location.

7. In a playback apparatus for magnetic tape and the like, in combination, rotary take-up reel means; drive means for driving said reel means at a given speed; time indicating means cooperating with a tape on said reel means for indicating the time required for any part of the tape to reach a given location during winding of the tape on to said reel means when the latter is driven at said given speed; means cooperating with said reel means for maintaining a tape wound on to or off from said reel means taut; manually operable means cooperating with said drive means for actuating the latter to drive said reel means in one direction or the other at said given speed, whereby the time required for a part of the tape having a given time indication to reach said location during driving of said reel means is equal to the difference between said given time indication and the time indication of the part of the tape which happens to be at said location; and timing means cooperating with said drive means for limiting the period of operation thereof to said time required for said part of the tape having said given time indication to reach said location.

References Cited in the file of this patent

UNITED STATES PATENTS

| | | |
|---|---|---|
| 2,561,602 | Valentino et al. | July 24, 1951 |
| 2,612,565 | Heller | Sept. 30, 1952 |
| 2,676,212 | Williams | Apr. 20, 1954 |
| 2,683,568 | Lindsay | July 13, 1954 |
| 2,741,439 | Dale et al. | Apr. 10, 1956 |
| 2,782,398 | West et al. | Feb. 19, 1957 |
| 2,911,161 | Proctor | Nov. 3, 1959 |
| 2,953,312 | Munroe | Sept. 20, 1960 |